US007697888B2

(12) United States Patent
Le Naour et al.

(10) Patent No.: US 7,697,888 B2
(45) Date of Patent: Apr. 13, 2010

(54) BROAD DISTRIBUTION BI-DIRECTIONAL USER TERMINAL AT CONFIGURABLE BROADCAST FREQUENCIES

(75) Inventors: Jean-Yves Le Naour, Pace (FR); Dominique Lo Hine Tong, Rennes (FR); Philippe Chambelin, Chateaugiron (FR)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/572,089

(22) PCT Filed: Sep. 13, 2004

(86) PCT No.: PCT/FR2004/050429

§ 371 (c)(1), (2), (4) Date: Mar. 16, 2006

(87) PCT Pub. No.: WO2005/029719

PCT Pub. Date: Mar. 31, 2005

(65) Prior Publication Data

US 2007/0032190 A1 Feb. 8, 2007

(30) Foreign Application Priority Data

Sep. 18, 2003 (EP) .................................. 03292300

(51) Int. Cl.

| | |
|---|---|
| ***H04B 3/36*** | (2006.01) |
| ***H04B 7/14*** | (2006.01) |
| ***H04H 20/74*** | (2008.01) |

(52) U.S. Cl. .......................................... 455/3.02; 455/7

(58) Field of Classification Search ................ 455/3.02, 455/7

See application file for complete search history.

(56) References Cited

U.S. PATENT DOCUMENTS

| | | | | |
|---|---|---|---|---|
| 6,111,474 | A * | 8/2000 | Nibe | 333/26 |
| 6,366,620 | B1 | 4/2002 | Jackson et al. | |
| 6,987,960 | B2 * | 1/2006 | Kashima | 455/318 |
| 7,065,326 | B2 * | 6/2006 | Lovberg et al. | 455/77 |

(Continued)

FOREIGN PATENT DOCUMENTS

| | | |
|---|---|---|
| DE | 473076 | 3/1992 |

(Continued)

OTHER PUBLICATIONS

A. Kirilenko et al., Institute of Electrical and Electronics Engineers: "Harmonic Rejection Filters for the Dominant and the Higher Waveguide Modes Based on the Slotted Strips", 2002 IEEE MTT-S International Microwave Symposium Digest, Seattle, WA, 62-7,2002, vol. 1 of 3, Jun. 2, 2002, pp. 373-376.

(Continued)

*Primary Examiner*—Matthew D Anderson
*Assistant Examiner*—Bobbak Safaipour
(74) *Attorney, Agent, or Firm*—Robert D. Shedd; Joseph J. Opalach; Brian J. Cromarty

(57) ABSTRACT

The invention proposes an upgradable product capable of covering two sub-bands. An outdoor unit comprises, on the uplink, a switchable oscillator coupled to a waveguide featuring a removable cover enabling the said waveguide to be converted into a band rejector filter.

6 Claims, 3 Drawing Sheets

U.S. PATENT DOCUMENTS

| | | | | |
|---|---|---|---|---|
| 7,177,618 | B2 * | 2/2007 | Motoyama | 455/323 |
| 2003/0083034 | A1 * | 5/2003 | Motoyama | 455/323 |
| 2003/0152140 | A1 * | 8/2003 | Antoniak | 375/219 |
| 2003/0224801 | A1 * | 12/2003 | Lovberg et al. | 455/454 |
| 2004/0043743 | A1 * | 3/2004 | Rzyski et al. | 455/324 |
| 2004/0072550 | A1 * | 4/2004 | Motoyama | 455/323 |
| 2004/0203337 | A1 * | 10/2004 | Ammar | 455/3.02 |
| 2004/0203528 | A1 * | 10/2004 | Ammar et al. | 455/90.3 |
| 2005/0042993 | A1 * | 2/2005 | Cremin et al. | 455/118 |
| 2007/0182866 | A1 * | 8/2007 | Birleson et al. | 348/725 |

FOREIGN PATENT DOCUMENTS

| | | |
|---|---|---|
| WO | WO 00/03494 | 1/2000 |

OTHER PUBLICATIONS

Search Report Dated Mar. 23, 2005.

* cited by examiner

BROAD DISTRIBUTION BI-DIRECTIONAL USER TERMINAL AT CONFIGURABLE BROADCAST FREQUENCIES

This application claims the benefit, under 35 U.S.C. §365 of International Application PCT/FR04/050429, filed Sep. 13, 2004, which was published in accordance with PCT Article 21(2) on Mar. 31, 2005 in French and which claims the benefit of European patent application No. 03292300.5, filed Sep. 18, 2003.

1. Background of the Invention

The invention relates to a bi-directional user terminal with configurable transmission frequencies, particularly a satellite terminal with return channel capable of operating in a frequency band such as the Ku, Ka or other bands.

The present invention will be described by referring to a Ka band bi-directional terminal.

2. Description of the Prior Art

Hence, FIG. 1 illustrates an example of standard architecture of a Ka band frequency transposition circuit or BUC (Block Up Conversion) placed in an outdoor transmission unit (or ODU for "Outdoor Unit"). The RF signal at an intermediate frequency IF in the 0.95-1.45 GHz band is from the indoor unit (or IDU) and is transposed into the Ka band by implementing a subharmonic mixer (X2) and a local oscillator (hereafter LO) operating at the Ku band. The output of the mixer X2 is sent to a band-pass filter 1. Indeed, a highly selective band-pass filtering is required in particular to eliminate the residual Ka band (2*LO) component that is twice the frequency of the local oscillator, which must not be radiated by the terminal.

In a known manner, the output of filter 1 is sent to an amplifier 2 whose output is connected to the source 3 of an antenna 4.

For implementation reasons, operators require a Ka band application with a wideband transmission that can be selected from two frequency bands, for example the 28.4-28.6 GHz band and the 29.5-30 GHz band, either of these bands being assigned to the user according to his requirements and/or his geographical location. For such an arrangement, the transmission bands correspond to the frequencies of the local oscillator LO of the BUC, respectively 13.725 GHz and 14.275 GHz. The unwanted components to filter corresponding to 2*LO are then 27.45 and 28.55 GHz. As shown in FIG. 2 which illustrates the frequency plans corresponding to the two Ka band frequencies emitted (respectively in highband and lowband), the 2*LO components (28.55 GHz and 27.45 GHz) are outside of the plans. One approach typically implemented in this case is to propose two types of separate terminals capable of covering one or other of the frequency bands, this to the detriment of the cost of the terminal.

SUMMARY OF THE INVENTION

The invention therefore proposes an upgradable product capable of covering several bands or sub-bands, which can be easily configured and installed on site without the intervention of a professional so as to noticeably reduce installation costs.

Moreover, the invention proposes only one type of terminal that can cover the different bands, which is of significant economic interest. Hence, the minimisation of the industrialisation costs and the increase of production volumes enable the cost of the terminal to be reduced. Moreover, several operators can use the same product.

The invention relates more particularly to an outdoor unit of a reception terminal including a return channel. The return channel (BUC) comprises:

- a local oscillator providing a signal with a frequency that can be selected from at least two frequencies,
- a transposition means that transposes a signal to be transmitted by using the signal provided by the local oscillator,
- a wideband filtering means that allows through signals whose frequency corresponds to the transposed signal independently from the frequency of the local oscillator local, and
- a waveguide element having a cover that depends on the frequency selected for the local oscillator.

According to a characteristic of the invention, the waveguide cover transforms the waveguide into a band rejector filter that rejects a bandwidth corresponding to a leak of the transposition frequency in the wideband.

According to a first embodiment, the cover is either a flat cover or a cover including slot-coupled resonant cavities.

According to another embodiment, the waveguide comprises slot-coupled resonant cavities and the cover is either a flat cover, or a cover comprising elements that electrically plug the slots.

BRIEF DESCRIPTION OF THE DRAWINGS

The invention will be better understood, and other specific features and advantages will emerge from reading the following description, the description making reference to the annexed drawings wherein.

DESCRIPTION OF THE PREFERRED EMBODIMENT

Figure 1:
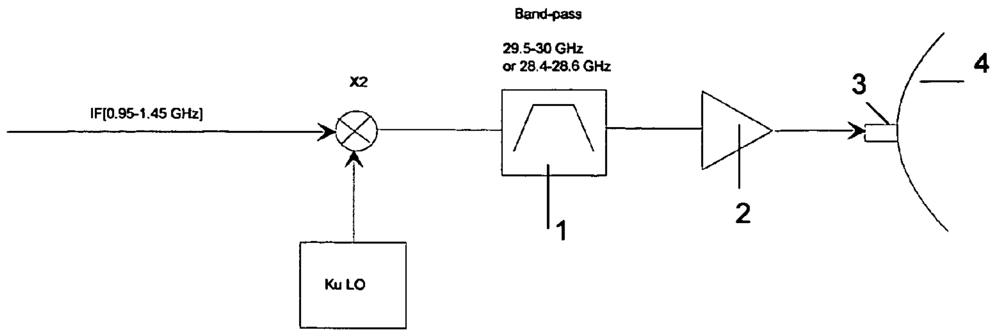
FIG. 1 already described shows a BUC architecture according to the prior art, in the case of a terminal operating in the Ka band.
Figure 2:
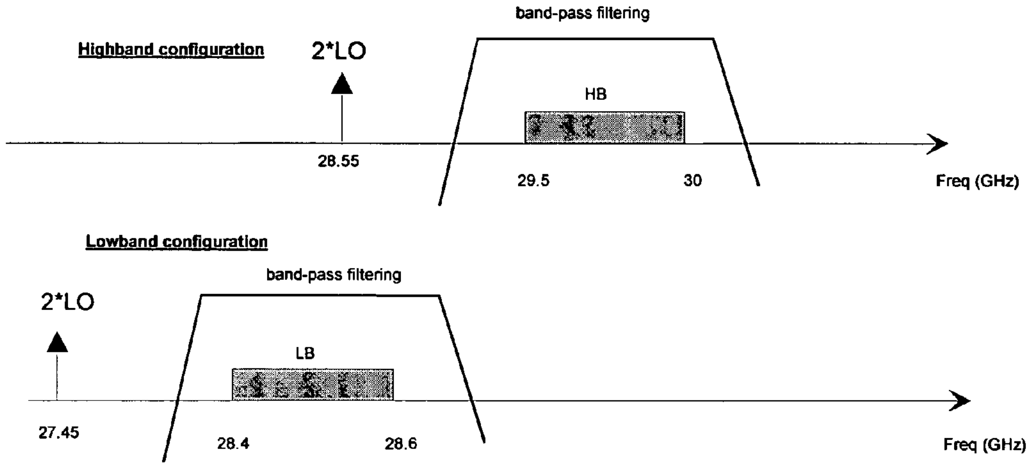
FIG. 2 already described shows the transmission frequency plans of a system using two sub-bands, as described in FIG. 1.
Figure 3:
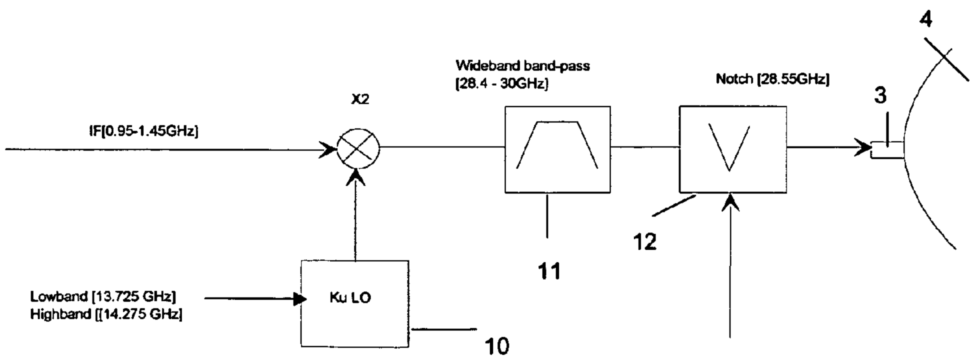
FIG. 3 diagrammatically shows an embodiment of the invention.

FIG. 3 shows the radio architecture of a BUC compliant with the present invention in the case of a bi-directional terminal operating in the Ka band. The BUC proposed is capable of covering the two previously cited frequency bands, namely 28.4-28.6 GHz and 29.5-30 GHz. As explained below with reference to FIG. 7, the BUC implements a wideband band-pass filtering covering the two frequency bands, namely 28.4-30 GHz, and capable of rejecting the lowest 2*LO frequency (corresponding to the lowband LB).

More specifically, the return channel to the BUC of FIG. 3 thus comprises a subharmonic mixer X2 receiving respectively as an input the RF signal at the IF intermediate frequency in the bandwidth 0.95-1.45 GHz and the signal from a local oscillator 10 whose oscillation frequency LO can be adjusted to 13.725 GHz or 14.275 GHz according to the high or low band operation selected.

The output of the mixer X2 is sent to a band-pass filter 11 covering the two bands, namely 28.4-30 GHz in the embodiment shown. The output of the band-pass filter 11 is sent to a rejector filter 12. In accordance with the invention, the rejector filter 12 is a configurable filter and is capable of effectively rejecting the highest 2*LO frequency (corresponding to the highband HB). The rejector filter 12 is, for example, a waveguide rejector filter that can easily be connected to a band-pass filter featuring guide accesses itself. The rejector filter 12 is connected to the feed of the antenna 4.

Figure 4A:
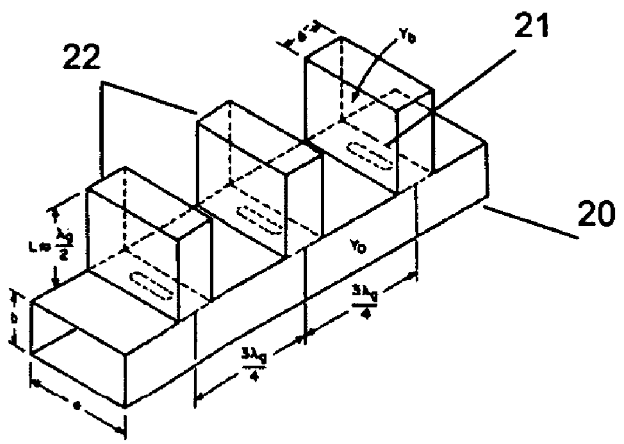
FIG. 4 shows the perspective configuration of a standard band-stop filter.

An example of rejector filter or band-stop filter is shown in FIG. 4*a*. In this case, it is a three-pole filter, namely a rectangular waveguide 20 coupled by slots 21 with three resonant cavities 22 attuned to the frequency to reject. More specifically, the resonant cavities 20 that form the resonant elements LC have a length noticeably equal to $\lambda g/2$, where $\lambda g$ is the guided wavelength calculated at the rejection frequency. The cavities are coupled to the main guide by inductive slots 21. The distance between two slots is preferably equal to 3 $\lambda g/4$ to prevent coupling effects between the slots, although theoretically, it could be $\lambda g/4$.

The terminal thus described can be configured simply by modifying the frequency of the local oscillator 10 and by activating/deactivating the rejector filter 12. The frequency of the local oscillator 10 is modified for example in a 'mechanical' manner by operating a switch accessible to the operator. As a variant, the local oscillator frequency can also be modified by the intermediary of the indoor unit or IDU that then controls an outdoor unit or ODU by a bus of the Disecq type for example.

Figure 5A:
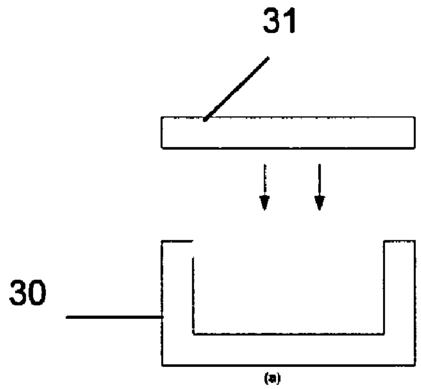
FIGS. 5*a* and 5*b* diagrammatically show a first embodiment of the present invention, FIGS. 6*a* and 6*b* diagrammatically show a second embodiment of the present invention.
Figure 5B:
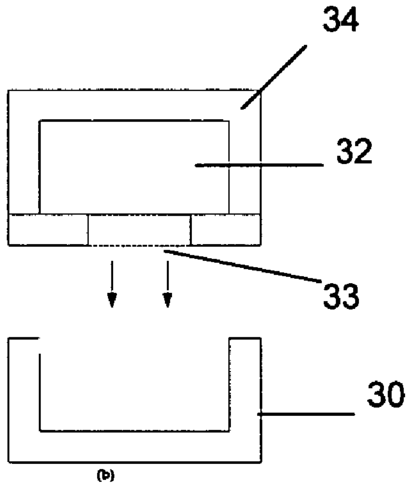

It is considered that the rejector filter is an integral part of the feed of the antenna, so that the extra cost brought by this function remains minimal. To activate or deactivate a filter of the type of the one shown in FIG. 4, namely to make this filter configurable, the following two embodiments are possible:

The first embodiment, shown in FIGS. 5*a* and 5*b*, consists of a guided structure 30 whose cover 31 is flat if no band-stop filtering is required, as shown in FIG. 5*a*. Otherwise, this cover is replaced by a cover 32 that contains the coupling slots 33 as well as the resonant cavities shown in FIG. 5*b*.

Figure 6A:
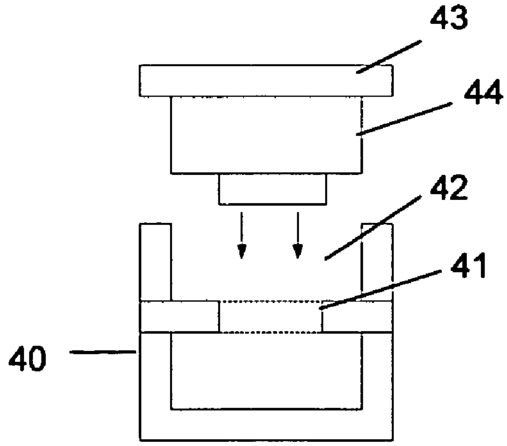
Figure 6B:
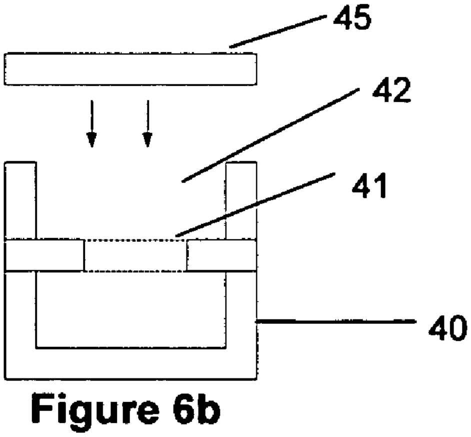

The second embodiment, shown in FIGS. 6*a* and 6*b*, consists of a guided structure 40 including the coupling slots 41 and the resonant cavities 42 but open at the upper part. In the case of a non-filtering guide, the cover 43 comprises profiled elements 44 enabling the apertures that are the slots 41 and the open cavities 42 to be plugged as shown in FIG. 6*a*. Otherwise, the guide becomes filtering by simply fixing a flat cover 45 above the guided structure.

Figure 7:
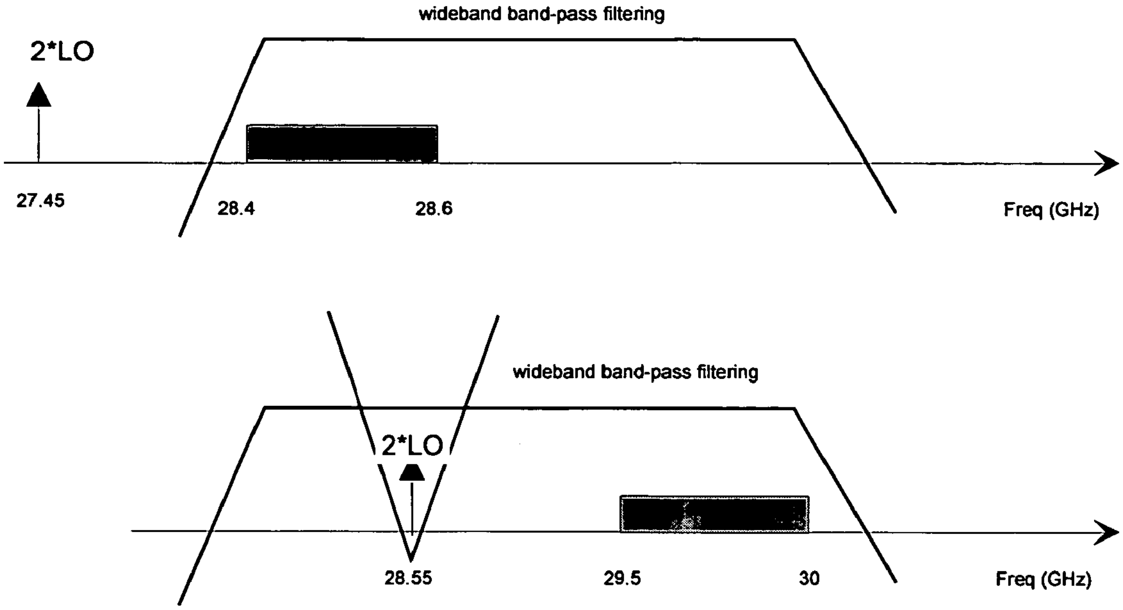
FIG. 7 shows the transmission frequency plans corresponding to the invention.

FIG. 7 shows the two frequency plans on the FIG. 6*b* (lowband and highband) with switching of the local oscillator at the LO frequency and activation/deactivation of a rejector filter at 28.55 GHz.

This upgradable terminal can easily be configured by the user without the intervention of a professional, thanks to a manual switch (or automatic, controlled by the IDU) and by modifying the filtering by changing the cover of a waveguide. This system can noticeably reduce the installation cost. The same concern applies for reducing the terminal installation costs, this technique can naturally be extended to any other multi-band transmission device.

The present invention was described by referring to a terminal operating in the Ka band with a rejector filter constituted by a 3-pole rectangular waveguide. It is evident to those in the profession that it can be used in terminals operating at other bands and with different waveguide rejector filters. For example, the present invention can also be implemented in high frequency multi-band user terminals for MMDS (Microwave Multipoint Distribution System) type applications operating in the 40 GHz bands.

The invention claimed is:

1. Outdoor unit of a reception terminal including a return channel, wherein the return channel (BUC) comprises:
- a local oscillator providing a signal with a frequency that can be selected from at least two frequencies,
- a transposition means that transposes a signal to be transmitted using the signal provided by the local oscillator,
- a wideband filtering means that allows through signals whose frequency corresponds to the transposed signal independently from the frequency of the local oscillator, and
- a configurable rejection filter depending on the frequency selected for the local oscillator;
- wherein the configurable rejection filter comprises a guided structure with a replaceable cover, wherein said replaceable cover may be either:
  - a cover including cavities or slots, which configures said configurable rejection filter into a band rejection filter that rejects a bandwidth corresponding to a leak of the transposition frequency, or
  - a flat cover, which causes the configurable rejection filter to operate as a substantially non-filtering element.

2. Outdoor unit according to claim 1, wherein the local oscillator comprises means for selecting the oscillation frequency.

3. Outdoor unit according to claim 2, wherein the means for selecting the oscillation frequency is either a manual switch or a command from an indoor unit or terminal.

4. Outdoor unit according to claim 1, wherein the replaceable cover including cavities or slots is a cover including slot-coupled resonant cavities.

5. An outdoor unit of a reception terminal including a return channel, wherein the return channel (BUC) comprises:
- a local oscillator providing a signal with a frequency that can be selected from at least two local oscillator frequencies,
- a transposition means that transposes a signal to be transmitted using the signal provided by the local oscillator,
- a wideband filtering means that passes the signal from said transposition means resulting from selection of any of said at least two local oscillator frequencies, and
- a configurable rejection filter for rejecting a leak of transposition frequency for at least one of said at least two local oscillator frequencies;
- wherein the configurable rejection filter is configured through placement of a cover on a waveguide
- wherein the configurable rejection filter comprises a guided structure with a replaceable cover, wherein said replaceable cover may be either:
  - a cover including cavities or slots, which configures said configurable rejection filter into a band rejection filter that rejects a bandwidth corresponding to a leak of a transposition frequency, or
  - a flat cover, which configures said configurable rejection filter to operate as a substantially non-filtering element.

6. Outdoor unit of a reception terminal including a return channel, wherein the return channel (BUC) comprises:
- a local oscillator providing a signal with a frequency that can be selected from at least two frequencies,
- a transposition means that transposes a signal to be transmitted using the signal provided by the local oscillator, a wideband filtering means that allows through signals whose frequency corresponds to the transposed signal independently from the frequency of the local oscillator, and a configurable rejection filter depending on the frequency selected for the local oscillator;

wherein the configurable rejection filter comprises a guided structure with a replaceable cover, wherein said replaceable cover may be either:

a flat cover, which configures said configurable rejection filter into a band rejection filter that rejects a bandwidth corresponding to a leak of the transposition frequency, or a cover comprising profiled elements, which configures said configurable rejection filter to operate as a substantially a non-filtering element.

* * * * *